(12) United States Patent
Greene

(10) Patent No.: US 6,527,338 B2
(45) Date of Patent: Mar. 4, 2003

(54) CHAIR ARM HINGE

(75) Inventor: David T. Greene, West Allis, WI (US)

(73) Assignee: Kracor, Inc., Milwaukee, WI (US)

( * ) Notice: Subject to any disclaimer, the term of this patent is extended or adjusted under 35 U.S.C. 154(b) by 0 days.

(21) Appl. No.: 09/800,030

(22) Filed: Mar. 6, 2001

(65) Prior Publication Data

US 2002/0017813 A1 Feb. 14, 2002

Related U.S. Application Data

(60) Provisional application No. 60/188,363, filed on Mar. 10, 2000.

(51) Int. Cl.$^7$ .................................................. A47C 7/54
(52) U.S. Cl. ...................... 297/115; 297/411.32; 16/342
(58) Field of Search ............................... 297/411.2, 115, 297/411.25, 411.31, 411.32, 411.29, 411.3, 411.36, 411.38, 162, 173, 411.35; 16/342

(56) References Cited

PUBLICATIONS

Seven (7) photographs of chair arm hinge of Todd Division of Chem–Tainer Industries.

*Primary Examiner*—Peter M. Cuomo
*Assistant Examiner*—Stephen Vu
(74) *Attorney, Agent, or Firm*—Andrus, Sceales, Starke & Sawall, LLP

(57) ABSTRACT

A hinge mounts an arm on a chair. A sleeve is secured to one side of the chair back. A shaft is rotatably received in the sleeve. The shaft can be retained within the sleeve by a retainer that is formed separate from or as a part of the shaft. The shaft is fastened to the arm of the chair. The shaft and sleeve have sector shaped extensions extending along the axis of rotation of the shaft that are engageable to position the arm in a generally horizontal position while allowing the arm to be rotated upwardly by a predetermined amount.

22 Claims, 4 Drawing Sheets

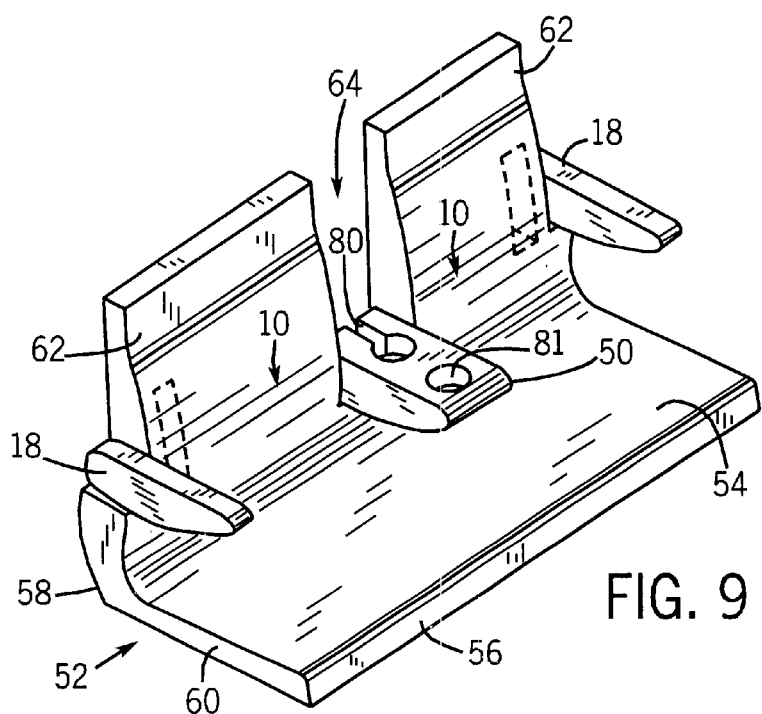
FIG. 9
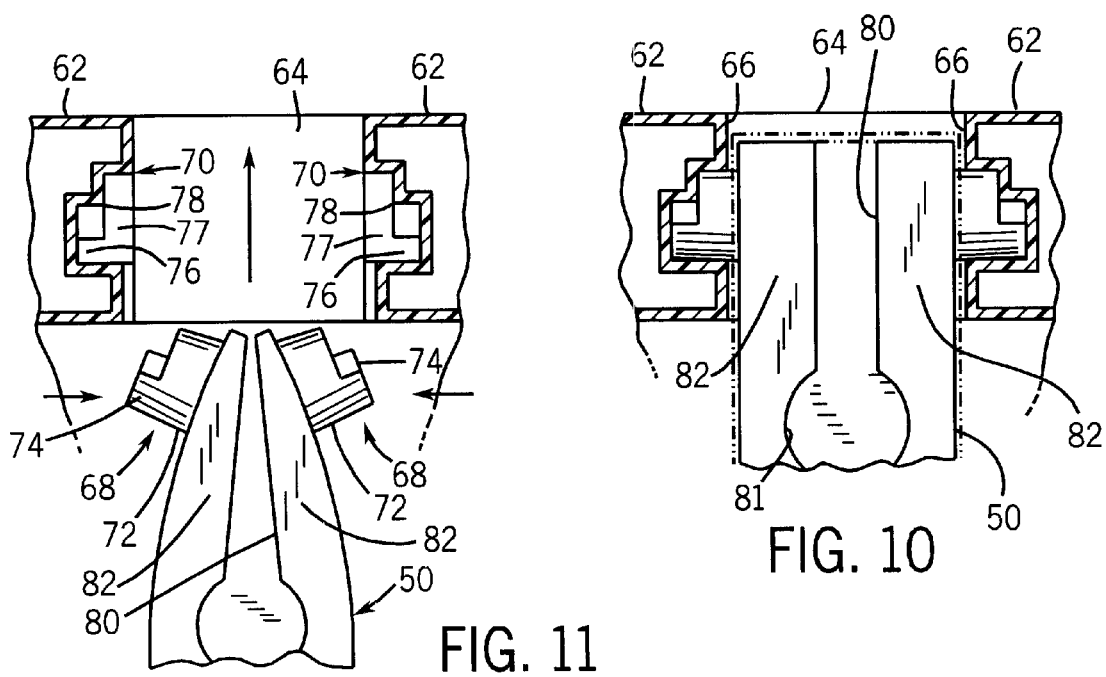
FIG. 10
FIG. 11

CHAIR ARM HINGE

CROSS-REFERENCE TO RELATED APPLICATIONS

This application is based on and claims priority from provisional patent Application No. 60/188,363 filed on Mar. 10, 2000.

BACKGROUND AND FIELD OF THE INVENTION

The present invention relates to an improved hinge structure for rotatably mounting an arm to a chair. The hinge structure finds particular use with chairs of hollow unitary construction and in adverse conditions, such as those encountered in a marine environment, although use of the hinge structure is not so limited.

While providing the advantages of durability and economy, hollow molded construction of a chair makes it difficult to fasten the arms to the chair so that the arms can withstand the use to which the chair is put and the environment to which it is subjected. Also, it is usually desirable to position the arms in a generally horizontal orientation, while at the same time allowing the arms to swing upwardly and out of the way, if desired. This further renders attachment of the arms to the chair more difficult.

BRIEF SUMMARY OF THE INVENTION

It is therefore the object of the present invention to provide an improved hinge structure for rotatably mounting arms to a chair in a strong and secure fashion. The hinge structure is suitable for use on hollow molded chairs, as well as other types of chairs, such as those having solid components. The construction of the hinge structure is one that allows the amount by which the arm is rotated to be easily varied. If desired, the hinge can be constructed to allow removal of the arm from the chair when the arm has been rotated to a selected position. The hinge structure is suitable for use in marine or other deleterious environment.

BRIEF DESCRIPTION OF THE SEVERAL VIEWS OF THE DRAWING

The foregoing and other features of the invention will become apparent from the following detailed description, taken in conjunction with the drawing in which:

FIG. 9 is a perspective/isometric view of a bench chair incorporating a second embodiment of the hinge structure of the present invention;

FIG. 10 is a cross-sectional view along line 10—10 of FIG. 9; and

FIG. 11 is a cross-sectional view similar to FIG. 10 illustrating the insertion of the chair arm of FIG. 9.

DETAILED DESCRIPTION OF THE INVENTION

Figure 1:
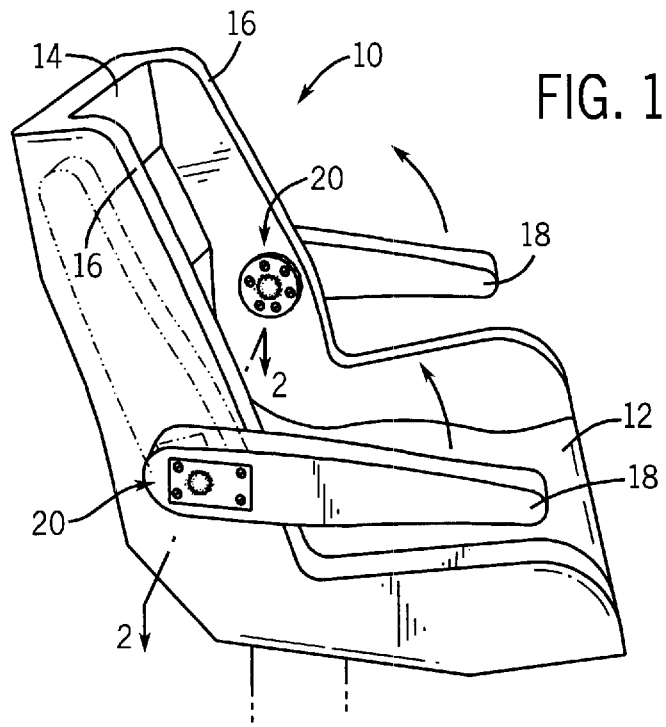
FIG. 1 is a perspective view of a chair with which the improved hinge structure of the present invention may be employed.

FIG. 1 shows chair 10 having seat 12 and back 14. Chair 10 may be of a solid construction or of hollow, unitary construction formed, for example, by rotational or blow molding. The latter is shown in the drawings. Back 14 of chair 10 has hollow wings 16 on each side. Wings 16 typically lie at an oblique angle to the back 14. Cushioning, such as a foamed plastic or rubber (not shown), is glued to the seat 12 and back 14 of the chair 10 between the wings 16 and covered with a covering (also not shown), such as cloth, plastic sheeting, or leather.

Figure 2:
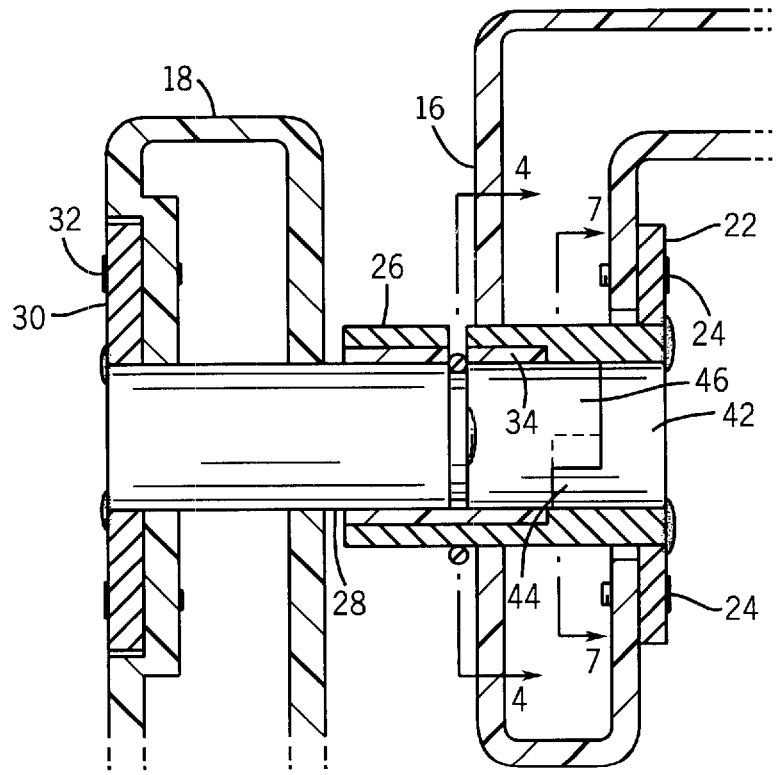
FIG. 2 is a cross sectional view taken along the line 2—2 of FIG. 1.
Figures 3, 4, 5:
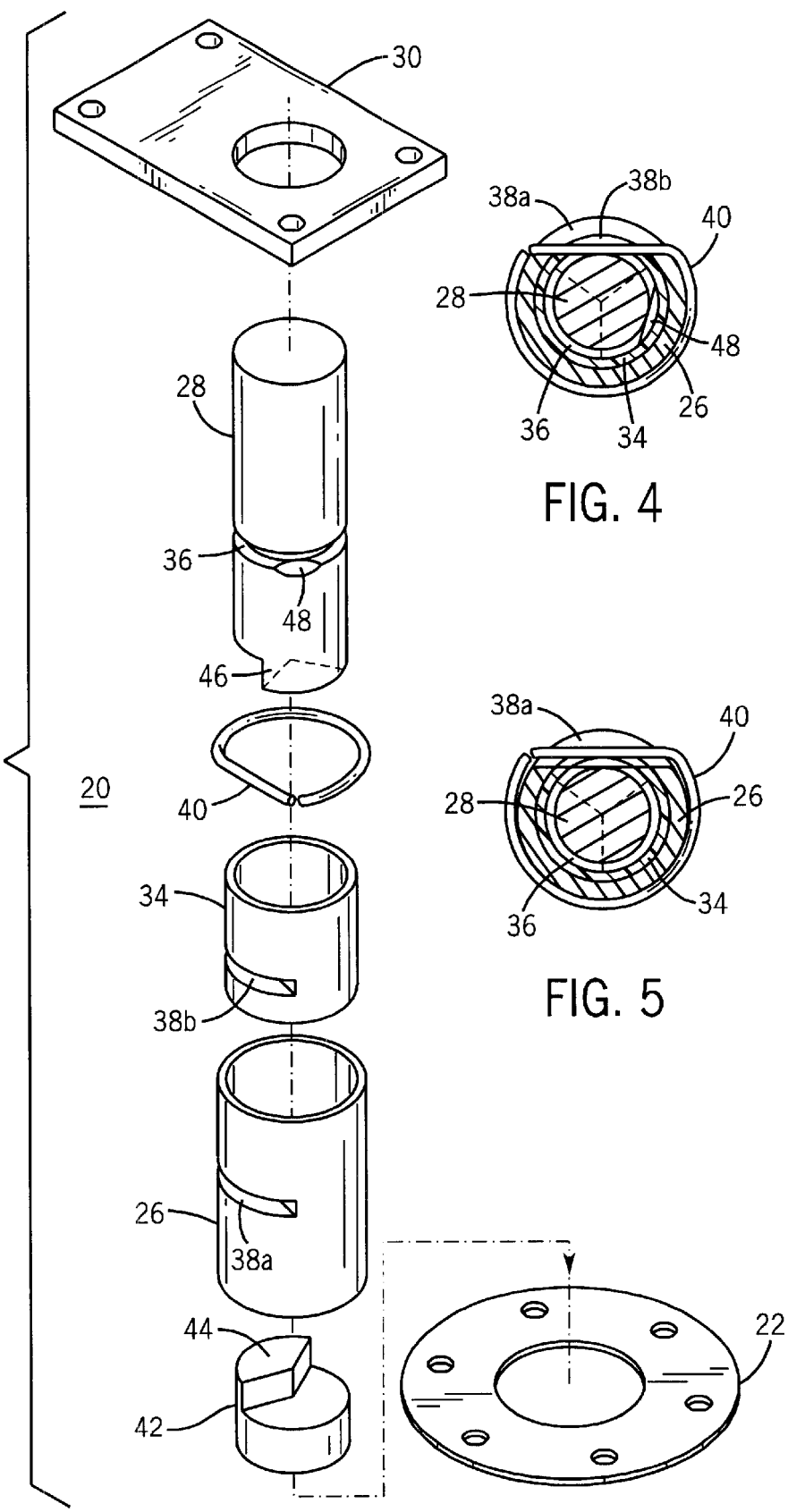
FIG. 3 is an exploded view of the hinge structure of FIG. 1.
FIG. 4 is a cross sectional view taken along the line 4—4 of FIG. 2.
FIG. 5 is a detailed cross sectional view showing a first modification to the hinge structure of FIG. 1 used to alter the manner in which the hinge structure is disassembled.

Arms 18 are fastened to the wings 16 by hinges 20. As shown in FIGS. 2 and 3, each hinge 20 includes a base 22 which is fastened by screws 24 to the exposed surface of the inside wall of the wing 16. Sleeve 26 is secured to the base 22 using any suitable means, such as welds 27, and extends through the inside and exterior walls of the wing 16, thereby to be supported at spaced points along its length by the inside and exterior walls of hollow wing 16. Sleeve 26 may be mounted at an oblique angle on the base 22 to control the angle of extension of the arms 18. For example, the sleeve 26 may be mounted on the base 22 so that the arms 18 extend generally parallel to each other or so that the arms 18 diverge with respect to each other at an angle less than that of wings 16.

Shaft 28 extends through the arm 18, which may also be of hollow construction. Shaft 28 is spacedly supported by the arm 18 in the same manner as the sleeve 26 is supported by the wing 16. Shaft 28 is affixed to plate, or other mounting means, 30 which is fastened to the outside of arm 18 by screws 32. The shaft 28 can be affixed to the plate 30 in a manner similar to that used to secure the sleeve 26 to the base 26, such as by welds 33.

Shaft 28 is rotatably received in sleeve 26 to mount arm 18 on wing 16. As shown in FIG. 2, sleeve 26 may contain a bushing 34 to facilitate the rotation of the shaft 28 when the chair 10 is used in adverse environments, such as a saltwater, marine environment. The bushing 34 is formed from a material having a low coefficient of friction to facilitate the rotation of the shaft 28 with respect to the bushing 34 and sleeve 26. Suitable materials include nylon, or the plastics sold under the trademarks Delrin or Teflon.

Further, as shown in FIGS. 2–4, shaft 28 has a circumferential groove 36 and sleeve 26 has a slot 38 which aligns with the groove 36 when the shaft 28 is received in the sleeve 26. A D-ring 40 surrounds sleeve 26 and is placed in the slot 38 and groove 36 to releasably retain the shaft 28 in the sleeve 26 and arm 18 on the wing 16 in the manner shown in FIG. 4. Other suitable fastening means than the D-ring 40 may be used, if desired.

To remove the shaft 28 from within the sleeve 26, the D-ring 40 can be pulled out of the groove 36 and slot 38 in order to remove the D-ring 40 from the hinge 20. The shaft 28 may then be slidably withdrawn from the sleeve 26.

To establish a generally horizontal position for arm 18 and to control the amount by which arm 18 may be rotated upwardly, the end of the sleeve 26 proximate to base 22 is provided with a plug 42 containing a sector shaped extension 44 extending into the sleeve 26 in a first direction along the axis of rotation for the shaft 28. Plug 42 may be secured in the sleeve 26 by the welds 27 or other securing means that secures the sleeve 26 to the base 22. Shaft 28 has a corresponding sector shaped extension 46 that extends along the axis of rotation for the shaft 28 when the shaft is received in the sleeve 26. Extensions 44 and 46 occupy a common portion along the axis of rotation so rotation of the shaft 28 is controlled by the engagement and disengagement of extension 46 with extension 44 as the shaft 28 is rotated.

Figure 7:
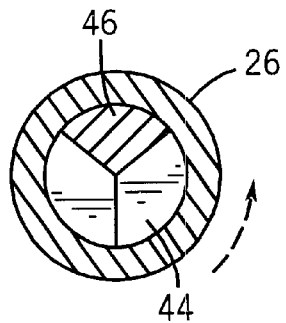
FIG. 7 is a cross sectional view taken along the line 7—7 of FIG. 2 showing the manner in which the rotation of the arm may be controlled.

More specifically, sleeve 26 and extension 44 and shaft 28 and extension 46 are oriented so that extensions 44 and 46 abut to position and support the arm 18 in a generally horizontal position, as shown in FIGS. 2 and 7. As arm 18 and shaft 28 are rotated upwardly from the horizontal position, as shown by the arrow in FIG. 7, the extension 46 separates from one side of the extension 44 to allow such rotation and then reengages with the other side of the extension 44 to control the rotation of the arm 18 to some desired amount. For example, sector shaped extensions 44 and 46 may be sized to allow arm 18 to be rotated 90° until it is vertical, or slightly beyond vertical, for example through 105°, thereby to align the arm with the slope of the chair back 14.

Figure 8:
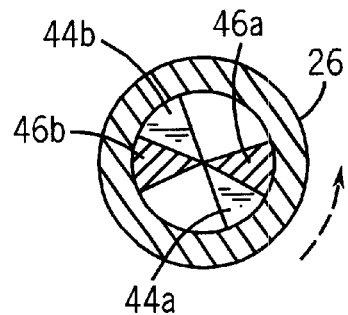
FIG. 8 is a cross sectional view similar to FIG. 7 showing a second modification of the hinge structure of FIG. 1.

While FIGS. 2 and 7 show sleeve 26 and shaft 28 as each having a single extension, if desired, the sleeve and shaft can be provided with a plurality of extensions 44a, 44b and 46a, 46b, as shown in FIG. 8.

Figure 6:
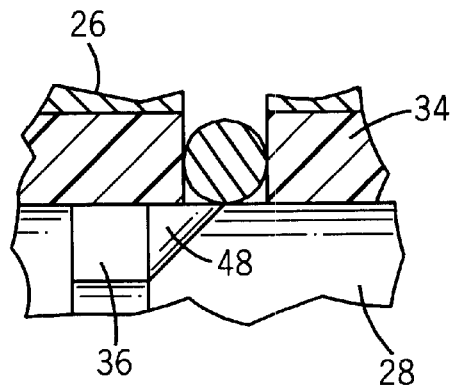
FIG. 6 is a cross sectional view similar to FIG. 4 of the arm partially disengaged from the chair as shown in FIG. 5.

Referring now to FIGS. 5 and 6, in a second embodiment for the hinge 20, groove 36 on the shaft 28 may be chamfered along at least a portion 48 of its length. The chamfer 48 allows shaft 28 and arm 18 to be pulled past D-ring 40 when arm 18 is in a specified position to allow arm 18 to be removed from chair 10 in an alternative manner to that used with respect to the hinge 20 shown in FIGS. 2 and 3. The chamfered portion 48 allows arm 18 to be removed when the portion 48 has been rotated upwardly from the horizontal position to align the portion 48 with the slot 38 on the sleeve 26, as shown in FIG. 6. The arm 18 and shaft 28 can then be pulled in the direction indicated by the arrow A to remove the arm 18 from back 14 of the chair 10.

Referring now to FIGS. 9–11, a third embodiment of the present invention is illustrated in which an arm 50 is pivotally secured to a bench 52. The bench 52 is formed of a thermoplastic material and has a seat 54 having a front end 56, a rear end 58, and a pair of opposed sides 60 joining the front end 56 and rear end 58. The bench 52 also includes a pair of back sections 62 spaced from one another and extending upwardly from the rear end 58 of the seat 54. The back sections 62 are spaced inwardly from each side 60 in order to enable an arm 18 to be attached to each back section 62 and positioned flush with each side 60. The arms 18 are attached to the back section 62 utilizing the hinge 20 illustrated in FIGS. 2 and 3. The side sections 62 also define a channel 64 between the back section 62 in which the arm 50 is positioned.

The arm 50 is also formed of a thermoplastic material and is pivotally secured to each back section 62 utilizing a pair of hinges 66 located on each side of the arm 50. Each hinge 66 includes a male portion 68 that is integrally formed with and extends outwardly from one side of the arm 50, and a female portion 70 inwardly formed with and extending inwardly into the side of each back section 62 adjacent the channel 64. The male section 68 has a circular base 72 which extends outwardly from the arm 50 and a sector shaped extension 74 extending outwardly from the base 72 opposite the arm 50.

The female portion 70 includes a circular recess 76 that extends inwardly from the channel 64 into each back section 62 and defines an interior 77, and a sector shaped extension 78 extending outwardly from the interior 77 of the recess 76 towards the channel 64. The rotation of the arm 50 is controlled in a manner similar to that used to control the rotation he hinge 20 because extensions 74 and 78 occupy a common portion along the axis of rotation of the hinges 66, so the rotation of the arm 50 is controlled by the engagement and disengagement of extension 74 with extension 78 as the arm 50 is rotated.

The arm 50 also includes a notch 80 located between the respective male portions 68 on the arm 50 that extends inwardly into the arm 50. The notch 80 intersects an opening 81 in the arm 50 and can be any shape capable of allowing the sections 82 of the arm 50 carrying the male portions 68 to flex inwardly with respect to one another, but is preferably rectangular in shape. The notch 80 allows the arm 50 to be inserted into the channel 64 in engagement with the back section 62 by allowing the sections 82 of the arm 50 carrying the male portion 68 to flex inwardly such that each male portion 68 can be inserted within the respective female portion 70 on each back section 62 as best shown in FIG. 10. Once the male portions 68 are aligned with the associated female portions 70, the sections 82 can be released and the resiliency of the material forming the arm 50 allows the notch 80 to return to its original shape and bias the male portions 68 into engagement with the female portions 70 such that the arm 50 is reliably held in engagement between the back sections 62 as shown in FIG. 10.

The various components of the embodiments of the improved hinge of the present invention may be formed from a suitable metal, such as aluminum or stainless steel, or plastic and may be fabricated, cast, or molded.

It is recognized that other equivalents, alternatives, and modifications aside from those expressly stated, are possible and within the scope of the appended claims.

What is claimed is:

1. A hinge suitable for mounting an arm on a chair, the chair having a wing along at least one side of a back, the wing having a wall proximate to the back, said hinge comprising:

a sleeve having an end attachable to one of the wall of the wing and the arm and adapted to extend from one of the wall and arm;

a shaft mountable to the other one of the wall and the arm and received in said sleeve for arcuate movement about an axis of rotation; and retaining means for retaining said shaft in said sleeve;

a portion of said sleeve adjacent to said end having a first sector shaped extension lying within said sleeve and extending along the axis of rotation;

said shaft having a peripheral surface extending circumferentially around said shaft and along said shaft parallel to the axis of rotation, said shaft having a second sector shaped extension extending inwardly from said peripheral surface along the axis of rotation, said second sector shaped extension being engageable with the first sector shaped extension of said sleeve when said shaft is received in said sleeve to support the arm when mounted on the hinge in a predetermined position while allowing the arm to be rotated with respect to the wall by a predetermined amount.

2. The hinge of claim 1 wherein the end of the sleeve is mounted to a base that is attachable to one of the wall of the wing and the arm.

3. The hinge according to claim 2 wherein the wing of the chair has an inside wall proximate the back and an exterior wall and wherein said base is mountable on the inside wall of the wing and said sleeve is extendable through the wing of the chair.

4. The hinge according to claim 3 wherein the wing is hollow between the inside and exterior walls and said sleeve is extendable through, and is spacedly supportable by, the inside and exterior walls of the wing.

5. The hinge of claim 1 wherein the shaft is secured to a mounting means mountable to the other one of the wall and the arm.

6. The hinge according to claim 1 wherein a bushing is interposed between said shaft and said sleeve.

7. The hinge according to claim 1 wherein said sleeve has a slot transverse to the axis of rotation, wherein said shaft has a circumferential groove aligned with said slot when said shaft is received in said sleeve; and wherein said retaining means comprises a retainer positioned in the slot and groove to retain said shaft in said sleeve.

8. The hinge according to claim 7 wherein said retainer comprises a D-ring surrounding said sleeve.

9. The hinge according to claim 7 wherein said groove is chamfered along at least a portion of its length to allow said shaft to be removed from said sleeve.

10. The hinge according to claim 9 wherein said chamfered portion is located to allow said shaft to be removed from said sleeve when said shaft is in a predetermined position of rotation.

11. The hinge according to claim 1 wherein said first sector shaped extension in said sleeve and said second sector shaped extension of said shaft are formed to support an arm mounted on the hinge in a generally horizontal position.

12. The hinge according to claim 1 wherein said first and second sector shaped extensions in said sleeve and of said shaft, respectively, are formed to allow said shaft to rotate at least 90°.

13. The hinge according to claim 12 wherein said first and second sector shaped extensions are formed to allow said shaft to rotate 105°.

14. The hinge according to claim 1 wherein one of said sleeve and shaft is mountable to said wall at an oblique angle to position an arm mounted on the hinge at a desired angle.

15. The hinge according to claim 1 wherein said shaft and sleeve each have a plurality of sector shaped extensions.

16. The hinge according to claim 1 wherein said sleeve is attachable to the wall of the wing and said shaft is mountable to the arm.

17. A hinge suitable for mounting an arm on a chair, the chair having a hollow wing along at least one side of a back, the wing having an inside wall proximate to the back and an exterior wall spaced from the inside wall, said hinge comprising:

a base mountable on the inside wall of the wing;

a sleeve having an end attached on said base, said base being extendible through the spaced inside and exterior walls of the wing of the chair when said base is mounted on the inside wall of the wing;

a shaft received in said sleeve for arcuate movement about an axis of rotation;

mounting means fastened to said shaft and mountable on the arm of the chair;

said sleeve having a slot transverse to the axis of rotation, said shaft having a circumferential groove aligned with said slot when said shaft is received in said sleeve;

a ring surrounding said sleeve and positioned in said slot and groove for retaining said shaft in said sleeve;

a portion of said sleeve adjacent to said end attached to said base having at least one first sector shaped extension lying within said sleeve and extending along the axis of rotation;

said shaft having at least one second sector shaped extension extending along the axis of rotation and engageable with at least one said first sector shaped extension of said sleeve when said shaft is received in said sleeve to support the arm when mounted to the hinge in a generally horizontal position while allowing the arm to be rotated upwardly by a predetermined amount.

18. The hinge according to claim 17 wherein said sleeve contains a bushing for receiving said shaft.

19. The hinge according to claim 17 wherein said groove is chamfered along at least a portion of its length to allow said shaft to be removed from said sleeve.

20. The hinge According to claim 19 wherein said chamfered portion is located to allow said shaft to be removed from said sleeve when the arm mounted on said shaft is in a upwardly rotated position.

21. The hinge according to claim 17 wherein at least one said first sector shaped extension and at least one said second sector shaped extension are formed to allow said shaft to rotate at least 90°.

22. The hinge according to claim 17 wherein said sleeve is mounted in said base at an oblique angle to position the arm of the chair at a desired angle.

* * * * *